(12) United States Patent
Chang et al.

(10) Patent No.: US 9,736,199 B2
(45) Date of Patent: Aug. 15, 2017

(54) DYNAMIC AND COLLABORATIVE WORKFLOW AUTHORING WITH CLOUD-SUPPORTED LIVE FEEDBACK

(71) Applicant: INTERNATIONAL BUSINESS MACHINES CORPORATION, Armonk, NY (US)

(72) Inventors: Rong N. Chang, Pleasantville, NY (US); Geetika T. Lakshmanan, Winchester, MA (US); Vinod Muthusamy, Ontario (CA); Wei Tan, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/472,851

(22) Filed: Aug. 29, 2014

(65) Prior Publication Data
US 2016/0063145 A1 Mar. 3, 2016

(51) Int. Cl.
G06F 9/44 (2006.01)
H04L 29/06 (2006.01)
G06F 17/50 (2006.01)
G06Q 10/10 (2012.01)

(52) U.S. Cl.
CPC ............ *H04L 65/403* (2013.01); *G06F 17/50* (2013.01); *G06Q 10/103* (2013.01); *G06F 2217/04* (2013.01)

(58) Field of Classification Search
CPC ........ G06F 17/5009; G06F 8/34; G06F 17/50; G06F 2217/04; G06Q 10/06; G06Q 10/103; H04L 65/403

USPC .......................................... 717/100–108, 135
See application file for complete search history.

(56) References Cited

U.S. PATENT DOCUMENTS

| 7,917,888 | B2 | 3/2011 | Chong et al. |
| 8,069,435 | B1 | 11/2011 | Lai |
| 8,170,901 | B2 | 5/2012 | Shukla et al. |
| 8,280,755 | B2 | 10/2012 | Stuhec et al. |
| 2013/0111483 | A1 | 5/2013 | Milic-Frayling et al. |
| 2013/0317871 | A1 | 11/2013 | Kulkarni et al. |

OTHER PUBLICATIONS

Rozinat et al. "Workflow Simulation for Operational Decision Support Using Design, Historic and State Information", 2008, Springer Verlag, pp. 1-16.*
A. Osterholm; "PyMorphic—a Morphic Based Live Programming Graphical User Interface Implemented in Python;" Final Thesis Department of Computer and Information Science at Linkoping University, 2006; 79 pages.

(Continued)

*Primary Examiner* — Ted T Vo
(74) *Attorney, Agent, or Firm* — Cantor Colburn LLP; Alexa Ashworth (57) ABSTRACT

Embodiments are directed to a method of developing a workflow. The method includes receiving a proposed workflow component at a local computing device of a workflow development system. The workflow development system generates a simulation stub derived from historical workflow execution logs that are relevant to the proposed workflow component. The workflow development system executes the simulation stub, which is an approximation of the proposed workflow component.

20 Claims, 5 Drawing Sheets

(56) References Cited

OTHER PUBLICATIONS

J. Rode; "Web Application Development by Nonprogrammers: User-Centered Design of an End-User Web Development Tool;" Diss. Virginia Polytechnic Institute and State Univ., 2005; 292 pages.
J. Vahatalo et al.; "Faster and More Focused Control-Flow Analysis for Business Process Models through SESE Decomposition;" Service-Oriented Computing—ICSOC 2007; Lecture Notes in Computer Science vol. 4749, 2007, pp. 43-55.
N. Collins et al.; "Live Coding in Laptop Performance;" Organised Sound 8(3); Cambridge University Press; 2003; pp. 321-329.
O. Nierstrasz et al.; "Agile Software Assessment;" Program Comprehension (ICPC), 2012 IEEE 20th International Conference on IEEE, 2012; 8 pages.
R. Minelli; "Commit 2.0 for Eclipse Enriching Commit Comments with Software Visualization," Universita della Svizzera Italiana Bachelor Thesis; Jun. 17, 2010; 31 pages.
Z. Gu; "Toward Effective Debugging by Capturing and Reusing Knowledge;" Diss. University of California, 2013; 124 pages.
Koop et al., "VisComplete: Automating Suggestions for Visualization Pipelines," IEEE Transactions on Visualization and Computer Graphics, vol. 14, No. 6, 2008, pp. 1691-1698.
Zheng et al., "Collaborative Web Service QoS Prediction via Neighborhood Integrated Matrix Factorization," IEEE Transactions on Services Computing, vol. 6, No. 3, 2013, pp. 289-299.

\* cited by examiner

DYNAMIC AND COLLABORATIVE WORKFLOW AUTHORING WITH CLOUD-SUPPORTED LIVE FEEDBACK

BACKGROUND

The present disclosure relates in general to systems and methodologies for providing live feedback during the development of workflows. More specifically, the present disclosure relates to systems and methodologies for allowing multiple workflow authors to collaborate on the design of workflows and simulate the execution of workflows during the development thereof.

A workflow consists of a sequence of connected steps wherein each step follows without delay or gap and ends just before the subsequent step may begin. It is a depiction of a sequence of operations, declared as work of a person or group, an organization of staff, or one or more simple or complex mechanisms. A workflow may be seen as a model that represents real work. For control purposes, a workflow may be a view of real work in a chosen aspect, thus serving as a virtual representation of actual work. The flow being described may refer to a document or product that is being transferred from one step to another.

Because workflows may be used to model a wide variety of situations, many of which are extremely complex, the development of workflows can easily become difficult, time consuming and inefficient. For example, it can be difficult, time consuming and inefficient to test the results of a newly developed workflow during development, collaborate with multiple authors to develop, update and evolve workflows over time, and generally provide assistance to workflow authors in addressing the various decision points and/or problems they encounter during workflow development.

SUMMARY

Embodiments are directed to a method of developing a workflow. The method includes receiving a proposed workflow component at a local computing device of a workflow development system. The workflow development system generates a simulation stub derived from historical workflow execution logs that are relevant to the proposed workflow component. The workflow development system executes the simulation stub, which is an approximation of the proposed workflow component.

Embodiments are further directed to a computer program product for developing a workflow. The computer program product includes a computer readable storage medium having program instructions embodied therewith, wherein the computer readable storage medium is not a signal, and the program instructions are readable by a processor circuit to cause the processor circuit to perform a method. The method includes receiving a proposed workflow component, generating a simulation stub derived from historical workflow execution logs that are relevant to the proposed workflow component, and executing the simulation stub. The simulation stub is an approximation of the proposed workflow component.

Embodiments are further directed to a collaborative workflow development system having a first local computing device in communication with a second local communication device through a collaborative workflow development network. The first local computing device is configured to receive from a first workflow author a first proposed workflow component of a workflow under development. The collaborative workflow system is configured to generate a first simulation stub derived from historical workflow execution logs that are relevant to the first proposed workflow component. The collaborative workflow system further is configured to execute the first simulation stub, which is an approximation of the first proposed workflow component. The collaborative workflow system is further configured to control, via the collaborative workflow development network, access by the second local computing device to the first proposed workflow component and a result of the collaborative workflow system executing the first simulation stub.

Additional features and advantages are realized through techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

In the accompanying figures and following detailed description of the disclosed embodiments, the various elements illustrated in the figures are provided with three digit reference numbers. The leftmost digits of each reference number corresponds to the figure in which its element is first illustrated.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
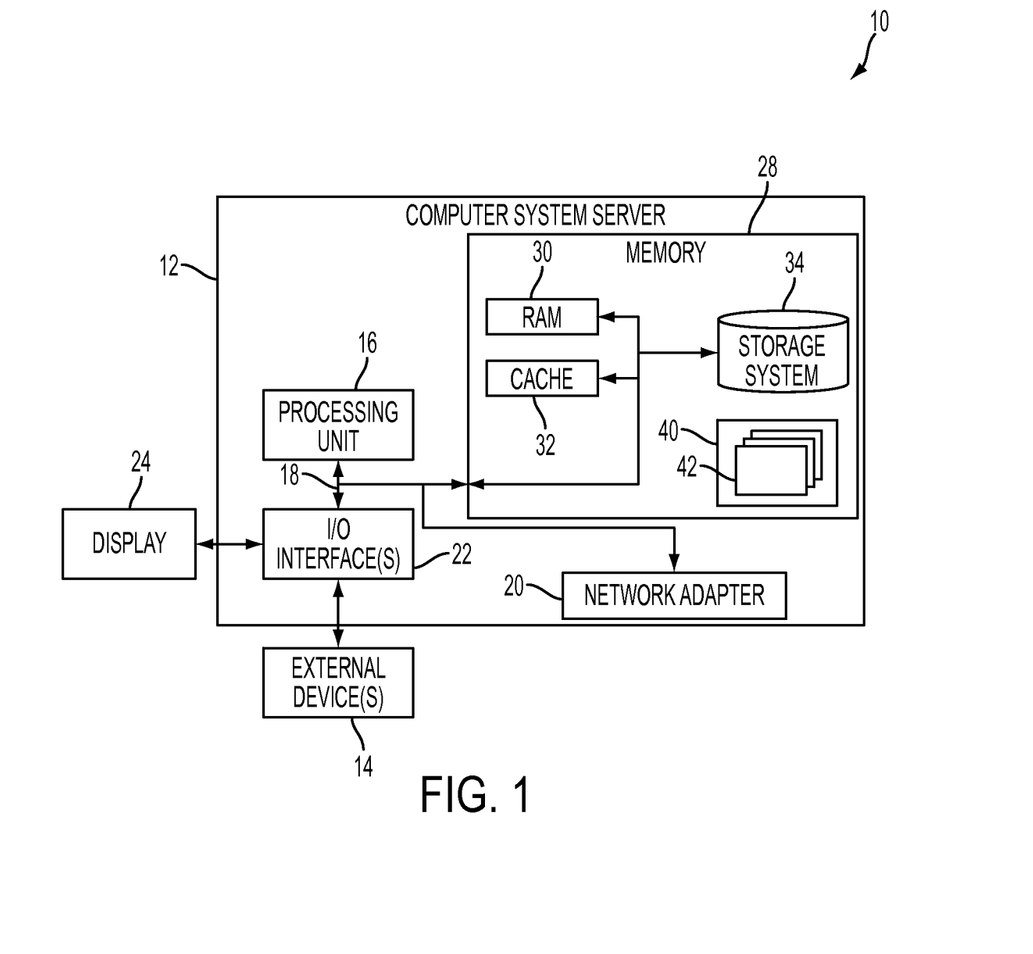
FIG. 1 depicts a cloud computing node according to one or more embodiments.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
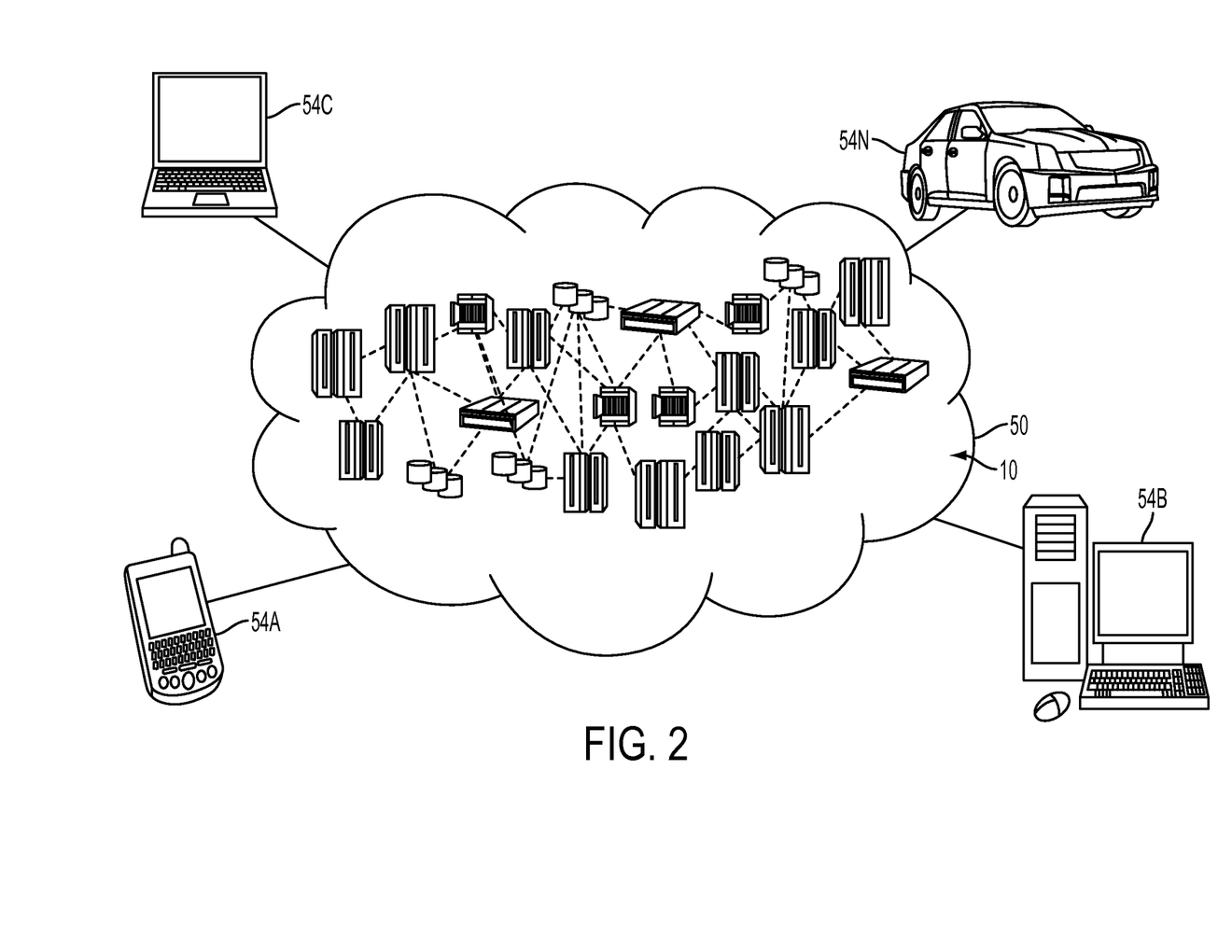
FIG. 2 depicts a cloud computing environment according to one or more embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
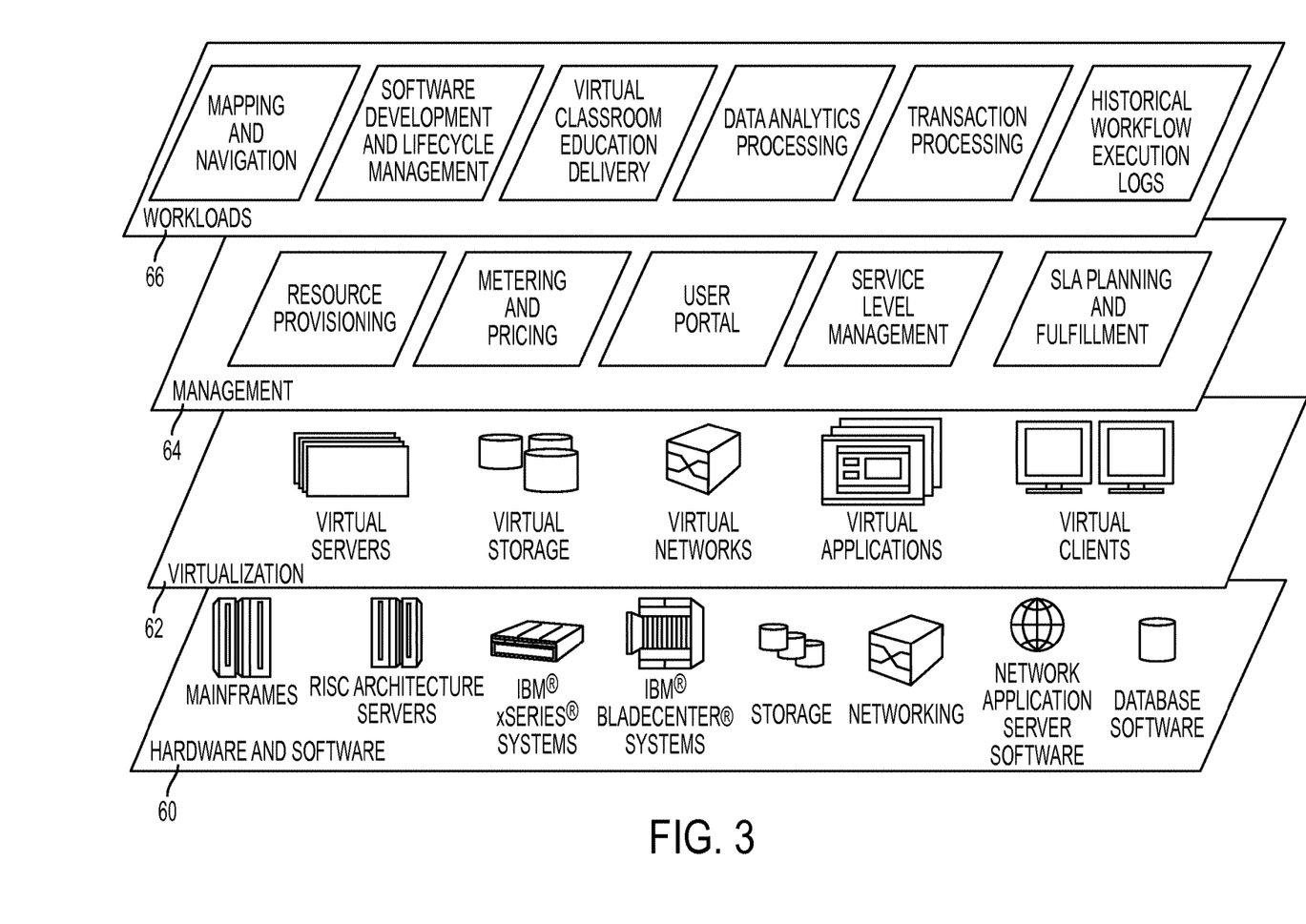
FIG. 3 depicts abstraction model layers according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and historical workflow execution logs that provide support for the dynamic authoring of workflows in a collaborative environment.

The present disclosure and embodiments disclosed herein relate specifically to using the historical workflow execution logs of workload layer 66 to support the dynamic authoring of workflows in a collaborative environment. As previously noted herein, a workflow consists of a sequence of connected steps wherein each step follows without delay or gap and ends just before the subsequent step may begin. It is a depiction of a sequence of operations, declared as work of a person or group, an organization of staff, or one or more simple or complex mechanisms. Workflow may be seen as a model that represents real work. For control purposes, workflow may be a view of real work in a chosen aspect, thus serving as a virtual representation of actual work. The flow being described may refer to a document or product that is being transferred from one step to another.

Because workflows may be used to model a wide variety of situations, many of which are extremely complex, the development of workflows can easily become difficult, time consuming and inefficient. For example, it can be difficult, time consuming and inefficient to test the results of a newly developed workflow during development, collaborate with multiple authors to develop, update and evolve workflows over time, and generally provide assistance to workflow authors in addressing the various decision points and/or problems they encounter during workflow development.

A typical workflow development methodology wherein a workflow author desires or needs to test the results of a workflow during development would require the author to first create a portion of a proposed workflow. Because workflows are often based on some input, the workflow author faces the task of specifying the appropriate inputs. The author must then deploy the specified inputs and the proposed workflow somewhere, obtain feedback on the deployment, and modify the proposed inputs and workflow based on the feedback, as needed. This process would be continued for each input and portion of the proposed workflow until the entire workflow is completed. As previously noted, this methodology is difficult, time consuming and inefficient. Thus, improving the selection of workflow inputs, as well as shortening the time it takes to obtain feedback on a proposed workflow, would improve the efficiency and decrease the level of difficulty of workflow development.

The tasks of improving the selection of workflow inputs and shortening the time it takes a workflow author to obtain feedback on a proposed workflow during development present a number of challenges. For example, it can be difficult for workflow authors to determine the appropriate inputs for a workflow under development, particularly if the author has limited experience with the activity that the workflow is attempting to model. Additionally, it may not be desirable to repeatedly execute some activities of a proposed workflow during development. For example, an activity may impose significant load on the system (e.g., a large network transfer), it may cost money to invoke (e.g., a credit check service that bills per invocation), it may have undesirable side effects (e.g., a bank funds transfer), or it may require access to data that is not available during a test deployment of the proposed workflow. These shortcomings are even greater in a collaborative workflow development environment wherein multiple partners must collaborate to collectively author, maintain and evolve the workflow over time.

Turning now to an overview of the present disclosure, the embodiments disclosed herein relate specifically to the portions of workload layer 66 that support the dynamic authoring of workflows in a collaborative environment. More specifically, the embodiments disclosed herein provide systems and methodologies for providing live feedback during the dynamic authoring of workflows. The disclosed embodiments further provide systems and methodologies for collaboratively allowing workflow authors to simulate the execution of workflows during the development thereof. The disclosed embodiments further provide systems and methodologies for supporting workflow authoring in a dynamic multi user environment, and using social network strength to bias workflow recommendations and encourage collaboration. The various workflow-related parameters described in the present disclosure may be represented in a wide variety of configurations, including but not limited to the Business Process Model and Notation (BPMN) format. BPMN is a standard for business process modeling that provides a graphical notation for specifying business processes in a Business Process Diagram (BPD) based on a flowcharting technique very similar to activity diagrams from Unified Modeling Language (UML). BPMN formats can include activities and gateways. The gateways could represent decision splits, wherein different flows may be recommended based on decisions.

Figure 4:
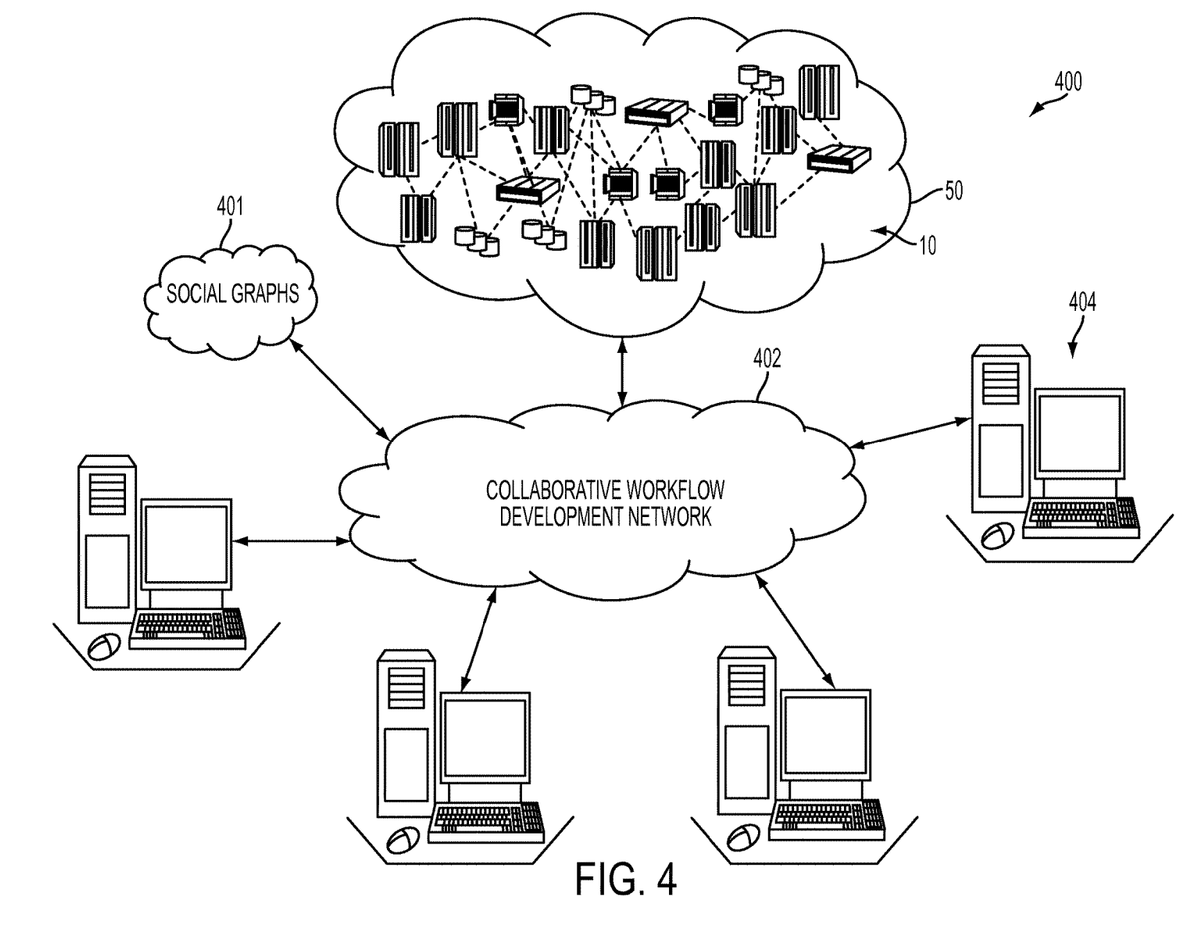
FIG. 4 depicts a diagram illustrating a workflow development system according to one or more embodiments.

In operation, the present disclosure includes at least one local computing device (e.g., 54A-54N shown in FIG. 2) in communication with a source of historical workflow (HWF) execution logs (e.g., cloud computing environment 50 shown in FIGS. 2 and 4). The communication path between the local computing device and HWF execution logs can include any type of network and/or network addressable connection (e.g., using a web browser). Under a collaborative workflow development configuration, multiple local computing devices may be provided (e.g., 404-410 shown in FIG. 4), with each local communication device in communication with the other local computing devices, the HWF execution logs source and other data of the local computing device and/or author (e.g., an author's social graph) via the network and/or network addressable connection. In general, the HWF execution logs are digital traces accumulated about how a wide variety of previously developed workflows were executed. The HWF may have been authored by the current author or a different author. The HWF may be very similar to the workflow under development, or the overall HWF may be different but have significant overlap or commonality with the workflow under development.

A methodology of the present disclosure begins with a user utilizing the above-described configuration (e.g., as shown in FIG. 2) to author a portion of an initial proposed workflow at a local computing device. In response to the initial proposed workflow, the system recommends to the user a variety of workflow parameters, including for example, workflow inputs, workflow outputs and workflow simulation stubs, drawn from the HWF execution logs. The term "stub" is used herein in an analogous manner to the way the term is used in a computer programming context. In computer programming, a stub is a piece of code used to stand in for some other programming functionality. A stub may simulate the behavior of existing code or be a temporary substitute for yet-to-be developed code. If the author's social graph is available, it can be used to bias the analysis of the HWF execution logs to provide better suggestions and simulations of the workflow. The system provides live feedback on the proposed workflow by executing the workflow simulation stubs and displaying the results. Thus, an author may see at a display terminal of the local computing device a divided screen, wherein a portion of the screen displays the proposed workflow, another portion of the screen displays the workflow parameters suggested by the system for the proposed workflow parameters, and yet another portion of the screen displays a simulation of the proposed workflow. A portion of the display screen may include graphical mechanisms (e.g., a graphical slider mechanism) that allow the workflow author to quickly and interactively adjust and/or explore parameters and variations of the workflow, such as adjustments to the execution time distribution of an activity, toggling between whether a set of activities execute in parallel or in sequence or adjusting the exception probability of an activity or workflow. The methodology may further include automatically updating the simulation view as the author makes changes to their code, replaying the simulation, moving among alternative display options for the simulation (e.g., graphical, or state graphs), or drilling down to a fragment of the workflow for purposes of a more granular examination.

The above-described systems and methodologies may be extended to a collaborative environment where workflow is continuously evolving in response to changing user needs and the evolution of the service registry ecosystem. Multiple authors/partners coalesce on the web to orchestrate a workflow, where they take turns to iteratively build the workflow together and edit and update it as necessary in response to changing business, economic, personal, social needs. Generally the collaborating authors/partners govern different resources of the process governed by the workflow, and therefore they need to individually update the workflow based on changing conditions, and in response to what other authors/partners are doing. Various modes of collaboration are provided. In one mode, each author modifies the workflow as they see fit, and the system aggregates these workflows. Each author's workflow is essentially a "vote," and the aggregate workflow is the result of the voting process. The voting phase may mimic existing electoral systems including first-past-the-post (i.e., the most popular "vote" wins), two-phase runoff, etc. Additionally, the "aggregation function" may vary from simply selecting among one of the votes, or actually generating a new workflow model that captures fragments from the individual votes. In another mode, a set of users take turns modifying the workflow until they converge on a mutually satisfactory model. In still another mode, a set of authors concurrently modify the workflow.

The above-described collaborative workflow development systems and methodologies may further include recommending workflow snippets to the authors based on an evaluation of the social graphs of the authors. The term "snippet" is used herein in an analogous same manner to the way the term is used in a computer programming context. In computer programming, snippets are small regions of reusable source code, machine code, or text. Ordinarily, snippets are formally defined operative units that will be incorporated into larger programming modules. Snippets are often used to clarify the meaning of an otherwise "cluttered" function, or to minimize the use of repeated code that is common to other functions. A social network may be mined from metadata gathered from the workflow orchestration site. The mined social data may be used to bias workflow snippet recommendations that take into account the strength of social relationships between the authors of the current workflow and the authors of the existing workflows from which workflow snippet recommendations are derived. In addition to gathering the social network data from the multi-user enabled dynamic workflow authoring site, social network data may also be gathered by mining and combining each author's Twitter, Facebook and other social network profile data. For example, physicians authoring a workflow about how to treat the same disease may "find" each other on this collaborative workflow authoring site as a result of the disclosed recommendation system, and the site may suggest that they team up and work together.

Turning now to the drawings in greater detail, wherein like reference numerals indicate like elements, FIG. 4 illustrates an exemplary workflow development system 400 in accordance with one or more embodiments of the present disclosure. As shown, workflow development system 400 includes cloud computing environment 50, cloud computing nodes 10, a collaborative workflow development network 402, a first local computing device 404, a second local computing device 406, a third local computing device 408 and a Nth local computing device 410, configured and arranged as shown. Workflow development system 400 allows dynamic authoring of workflows via local computing devices 404-410, collaborative workflow development network 402 and cloud computing environment 50. Workflow development system 400 provide a number of features, including authoring workflows with live feedback, collaborative workflow evolution during runtime, and assisting workflow authoring through socially biased recommended snippets. It should be noted that the various system functions and methodologies described herein may be performed by any portion of workflow development system 400. For example, the entire functionality of simulator 508 (shown in FIG. 5 and described in detail below) may be performed at cloud computing environment 50, collaborative workflow development network 402 or any of the local computing devices, 404, 406, 408, 410. Alternatively, the functionality of simulator 508 may be distributed among the various components of workflow development system 400. This flexibility applies to any of the system functionalities and methodologies described herein.

Figure 5:
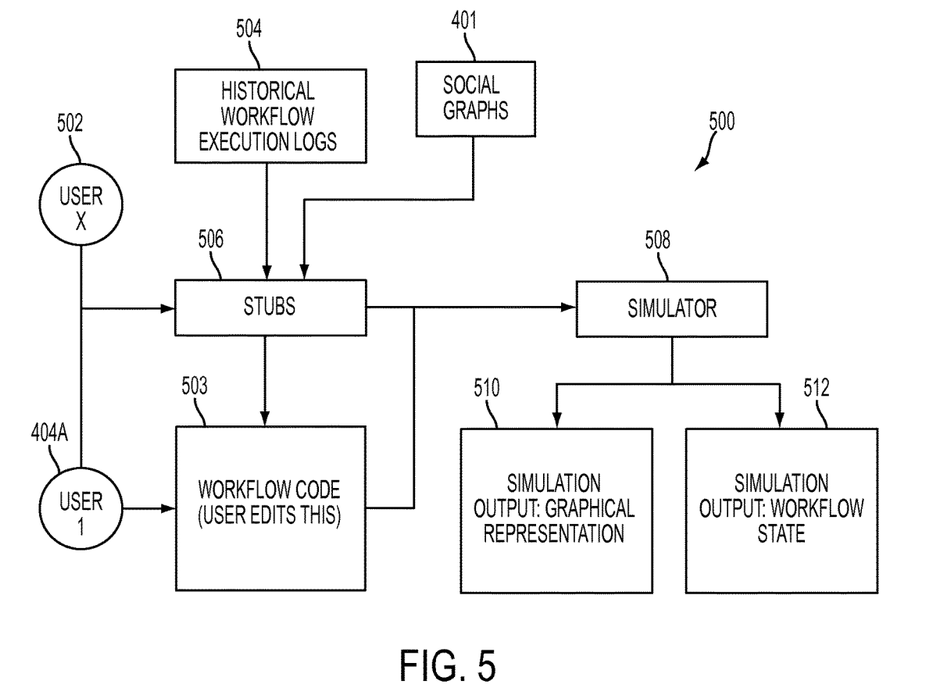
FIG. 5 depicts of a diagram of a workflow development methodology and system according to one or more embodiments.
Figure 6A:
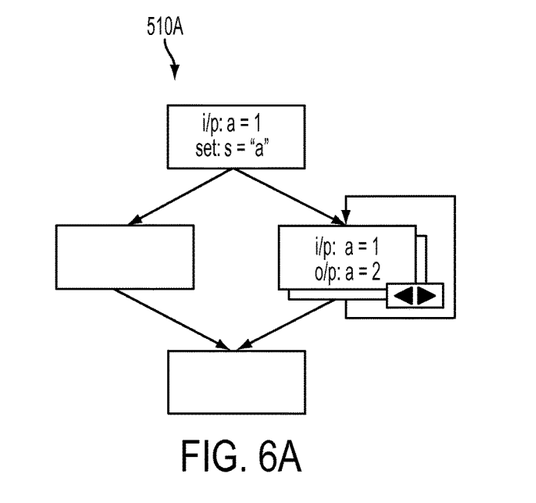
FIG. 6A is a diagram illustrating a display format according to one or more embodiments.
Figure 6B:
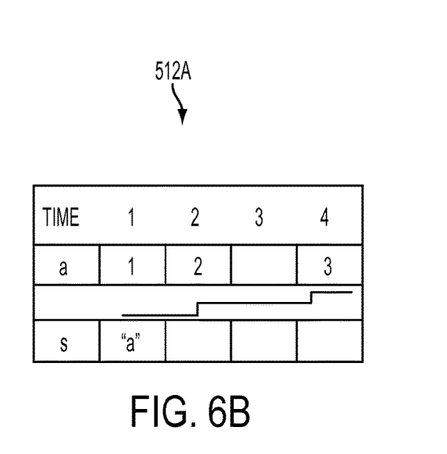
FIG. 6B is a diagram illustrating another display format according to one or more embodiments.

Turning now to a discussion of how workflow development system 400 may be used to implement workflow authoring with live feedback, FIG. 5 is a diagram 500 illustrating how a workflow author can dynamically simulate the execution of their workflow while they are authoring the workflow, thereby obtaining live feedback during development. Diagram 500 illustrates an unknown user x 502, historical workflow (HFW) execution logs 504, simulation stubs 506 (including stub decision points), a simulator 508, simulation outputs 510, 512, a first user 404A, workflow code under development 503, configured and arranged as shown. As shown in FIG. 5, a first user 404A authors a workflow at first local computing device 404 (shown in FIG. 4). Working through first local computing device 404, first user 404A specifies the appropriate inputs/outputs for workflow 503 either by writing the workflow inputs/outputs, choosing from a library of workflow inputs/outputs shared by other users (e.g., user x 502), or by letting first local computing device 404 generate recommended workflow inputs/outputs from historical workflow (HFW) execution logs 504 and/or social graphs 401 (e.g., social graphs of first user 404A). Working through first local computing device 404, first user 404A also selects simulation stubs 506 either by writing the simulation stubs, choosing from a library of simulation stubs shared by other users (e.g., user x 502), or by letting first local computing device 404 generate a simulation stub from the historical workflow (HFW) execution logs 504 and/or social graphs 401 (e.g., social graphs of first user 404A). As previously noted, the term "stub" is used herein in an analogous manner to the way the term is used in a computer programming context. In computer programming, a stub is a piece of code used to stand in for some other programming functionality. A stub may simulate the behavior of existing code or be a temporary substitute for yet-to-be developed code. Simulator 508, which may be provided by first local computing device 404, collaborative workflow development network 402 (shown in FIG. 4) or cloud computing environment 50 (shown in FIGS. 2 and 4), executes the selected simulation stub. First local computing device 404 displays simulation output 510, 512, along with its associated workflow code 503. First local computing device 404 automatically updates the simulation view as first user 404A makes changes to workflow code 503. First local computing device 404 allows first user 404A to organize and manipulate the simulations in a variety of ways, including replaying the simulation, moving between simulation 510 (graphical representation 510A shown in FIG. 6A) and simulation 512 (state representation 512A shown in FIG. 6B), and drilling down to a fragment of workflow code 503 and examining a simulation thereof. Thus, first local computing device 404A provides first user 404A with immediate feedback on the (simulated) execution of workflow 503 as first user 404A is editing workflow 503.

First local computing device 404 and collaborative workflow development network 402 allow the display of an integrated development environment having at least two display windows. In one display window, first user 404A authors workflows 503 (either graphically or by writing code). In the second display window, the simulated results of executing workflow 503 (e.g., simulation outputs 510, 510A, 512, 512A, shown in FIGS. 5, 6A and 6B) are shown. Another portion of the display screen may include graphical mechanisms (e.g., a graphical slider mechanism) that allow first user 404A to quickly and interactively adjust and/or explore parameters and variations of workflow 503, such as adjustments to the execution time distribution of an activity, toggling between whether a set of activities execute in parallel or in sequence or adjusting the exception probability of an activity or workflow. Simulation outputs 510, 512 are automatically updated as first user 404A edits workflow 503.

Turning now to a discussion of how workflow development system 400 of FIG. 4 may be used to implement collaborative workflow authoring with live feedback, multiple workflow authors at local computing devices 404, 406, 408, 410 collaboratively author a workflow together and update the workflow as conditions change, and essentially evolve the workflow over time to adapt to local, geographic, resource and other constraints. The multiple workflow authors coalesce via collaboration workflow development network 402 (e.g., the web) to orchestrate a workflow, where they take turns to iteratively build the workflow together and edit and update it as necessary in response to changing business, economic, personal, social needs. Generally these workflow authors govern different resources of the process governed by the workflow, and therefore they need to individually update the workflow based on changing conditions, and in response to what other workflow authors are doing.

Workflow development system 400 includes at least three modes of collaborative authoring. In a first mode, each user, working through a local computing device 404, 406, 408, 410, modifies the workflow as they see fit, and system 400 aggregates these workflows. Each user's workflow is essentially a "vote", and the aggregate workflow is the result of the voting process. The voting phase may mimic existing electoral systems including first-past-the-post (the most popular "vote" wins), two-phase runoff, etc. As well, the "aggregation function" may vary from simply selecting among one of the votes, or actually generating a new workflow model that captures fragments from the individual votes. In a second mode, a set of users take turns modifying the workflow until they converge on a mutually satisfactory model. In a third mode, a set of users concurrently modify the workflow.

The overall operation methodology of workflow development system 400 of FIG. 4 will now be described with reference to several use case examples. In a crowd sourcing example, business partners collaborate over workflow development system 400 to orchestrate a workflow. The workflow could be to build a website that publishes tasks open for crowd sourcing, where once completed, the work is checked, workers get paid, workers get rated, and new incoming tasks are assigned to good workers who performed well in the past and who are in need of work. Each business partner has a say in the workflow orchestration, and new workflow components may arrive that could be leveraged.

In an education use case example, geographically distributed business partners collaborate over workflow development system 400 to set up a workflow to provide and pay for distance education via the web. Classes are determined, teachers are set up, a payment system is established for teachers, and a class schedule is established and executed. As time elapses, the workflow needs to be updated to account for new classes, new teachers, new servers or IT subcontractor to pay for servers streaming the distance education content etc. The live workflow coding is necessitated by the fact that the partners are geographically distributed, and as conditions change, workflow snippets need to be added, deleted, updated, etc. by each individual partner. In different geographies, the course structure may need to be modified to account for quality and resources for students. For example, children in a village in a hard to reach part of the world may not have guaranteed access to electricity and other resources. Thus, the course deadlines and deliverables would need to be changed to account for changes in availability of resources.

In a big data course use case example, ABC Tech is starting a big data course at a university and has a workflow for how to do this. Each university is governed by its local country and state laws and university policies and hence the workflow needs to be modified for each university. In such a situation live workflow authoring by different partners (e.g., University Faculty & Personnel & ABC Tech employees) is ideally needed and needs to be sustained to allow the big data course process to be updated in response to changing political, economic and social demands.

Turning now to a discussion of how workflow development system 400 of FIG. 4 may be used to implement collaborative workflow authoring with live feedback and recommended workflow snippets, as authors are editing a workflow, workflow snippets may be recommended based on the degree of social strength between the current workflow authors and authors of recommended snippets. The term "snippet" is used herein in an analogous same manner to the way the term is used in a computer programming context. In computer programming, snippets are small regions of re-usable source code, machine code, or text. Ordinarily, snippets are formally defined operative units that will be incorporated into larger programming modules. Snippets are often used to clarify the meaning of an otherwise "cluttered" function, or to minimize the use of repeated code that is common to other functions. The data of social graphs 401 may be mined from data of collaborative workflow development network 402 or may be gathered by mining and combining each user's Twitter, Facebook and other social network profile data. Thus, for example, physicians authoring a workflow about how to treat the same disease may "find" each other on collaborative workflow network 402 as a result of system 400 generating analyzing social data to identify that the physicians have a common goal and recommending that the physicians team up and work together.

An overall operation of workflow development system 400 will now be described. A primary user working through local computing device 404 logs into collaborative workflow development network 402 via a web browser and begins orchestrating a workflow. The user receives live feedback of simulation runs of the workflow in accordance with diagram 500 (shown in FIG. 5). The user grants to other secondary users, working through local computing devices 406, 408, 410, with read/write privileges on the workflow. These secondary other users are registered users of a site on collaborative workflow development network 402. The primary user can designate the workflow access privileges as public, or private, or set up a privileged user list (e.g., user John, user Mary, etc.). As the primary user is editing the workflow, the workflow may be backed up in memory of local computing device (404, 406, 408, 410) and written to disk in cloud computing environment 50 periodically. Over time as conditions change, individual users can log in to collaborative workflow network 402 and update the workflow. The updates may be performed synchronously or asynchronously via the methods outlined above.

A methodology of workflow development system 400 that allows simultaneous editing of the workflow proceeds as follows. The workflow could be divided into single entry, single exit (SESE) fragments. This technique is well known in the relevant art. Each user is allowed to select a SESE fragment that is not currently being edited by another user, and allowed to edit this fragment. If a workflow is not yet composed, and multiple users wish to compose it together, each user could be assigned a unique time interval during which they are allowed to edit the workflow. Thus each workflow author would receive a turn to edit the workflow in a round robin fashion. Workflow authors may author snippets of the workflow asynchronously. Under this scenario, users may vote on workflow fragments, and ultimately workflow fragments with number of votes higher than a preset threshold could be selected. The snippets may then be coalesced manually by a single user.

As users interact, social graphs 401 may be mined on the basis of user interactions on collaborative workflow development network 402. The social network strength of connections between users can be amplified on the basis of their tweets, Facebook, Linkedin and other social network site activity. As users author a workflow, first the workflow is matched to other existing (completed or partially completed) workflows (or workflow snippets) on collaborative workflow development network 402 based on structures, content and context. Workflows could be ranked according to the social network strength between the authors of the currently composed workflow, and the authors of the workflows found during workflow updates. The top ranked workflows could be recommended to the authors of the currently composed workflow. Suggestions could be made to authors of workflows that are being concurrently authored to merge the workflows, assuming the workflows are similar as identified above, and assuming the social network strength between the respective authors is sufficiently strong.

Thus, it can be seen from the forgoing detailed description that technical benefits of the present disclosure include systems and methodologies that support the dynamic authoring of workflows in a collaborative environment. More specifically, the embodiments disclosed herein provide systems and methodologies for providing live feedback during the dynamic authoring of workflows. The disclosed embodiments further provide systems and methodologies for collaboratively allowing workflow authors to simulate the execution of workflows during the development thereof. The disclosed embodiments further provide systems and methodologies for supporting workflow authoring in a dynamic multi user environment, and using social network strength to bias workflow recommendations and encourage collaboration.

The disclosed embodiments make efficient use of HFW execution logs, which may be accessed through an internet connection to a cloud configuration. In general, HWF execution logs are digital traces accumulated about how a wide variety of previously developed workflows were executed. The HWF may have been authored by the current author or a different author. The HWF may be very similar to the workflow under development, or the overall HWF may be different but have significant overlap or commonality with the workflow under development.

Technical benefits and advantages of the present disclosure include but are not limited to assisting workflow authors by: recommending to workflow authors common workflow inputs/outputs that have been derived from HWF execution logs; recommending to workflow authors HWF-derived simulation stubs that may be used to simulate proposed workflows, thereby avoiding the undesirable side effects that could result from attempting to test a workflow by directly executing it, particularly when executing the workflow would involve interaction with external systems; and recommending to workflow authors stub decision logic, including the appropriate decision outcome for decision points in a workflow, derived from HWF execution logs. The collaborative configuration of the present disclosure supports a more democratic design of the workflow, supports the case where expertise is distributed, seamlessly supports workflow evolution and recommends potential collaborations between individual authors currently working separately on related workflows.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of developing a workflow, the method comprising:
   implementing, using a collaborative workflow development system, an interactive workflow authoring methodology comprising:

receiving a proposed workflow component of a workflow under development at a local computing device of said collaborative workflow development system;

determining, by said collaborative workflow development system, that at least one historical workflow developed prior to said proposed workflow component overlaps said proposed workflow component;

based at least in part on determining, by said collaborative workflow generating system, that said at least one historical workflow developed prior to said proposed workflow component overlaps said proposed workflow component, generating, by said collaborative workflow development system, a simulation stub derived from historical workflow execution logs of said at least one historical workflow, wherein said historical workflow execution logs comprise digital traces accumulated about how other previously developed workflows were executed; and executing, by said collaborative workflow development system, said simulation stub;

wherein said simulation stub comprises an approximation of said proposed workflow component.

2. The method of claim 1, wherein said interactive workflow authoring methodology further comprises:

generating, by said collaborative workflow development system, at least one recommendation related to said proposed workflow component;

wherein said at least one recommendation is derived from said historical workflow execution logs of said at least one historical workflow.

3. The method of claim 2 wherein:

said simulation stub is also derived from a social graph of an author of said proposed workflow component; and said at least one recommendation is also derived from said social graph of said author of said proposed workflow component.

4. The method of claim 1, wherein said interactive workflow authoring methodology further comprises:

displaying, by a display of said collaborative workflow development system, said proposed workflow component; and displaying, by said display of said collaborative workflow development system, results from said executing said simulation stub.

5. The method of claim 4 wherein:

said receiving said proposed workflow component occurs during a workflow development session; and said displaying said results from said executing said simulation stub occurs during said workflow development session.

6. The method of claim 5 further comprising said displaying said proposed workflow component occurring simultaneously with said displaying said results from said simulator.

7. The method of claim 1 wherein said executing said simulation stub comprises a simulation of an interaction with a system external to said workflow development system.

8. The method of claim 1 wherein said historical workflow execution logs are stored by a cloud computing environment of said workflow development system.

9. A computer program product for developing a workflow, the computer program product comprising: a computer readable storage medium having program instructions embodied therewith, wherein the computer readable storage medium is not a signal, the program instructions readable by a processor circuit to cause the processor circuit to perform a method comprising:

implementing through a collaborative workflow development system an interactive workflow authoring methodology comprising:

receiving a proposed workflow component of a workflow under development;

determining that at least one historical workflow developed prior to said proposed workflow component overlaps said proposed workflow component;

based at least in part on determining that said at least one historical workflow developed prior to said proposed workflow component overlaps said proposed workflow component, generating a simulation stub derived from historical workflow execution logs of said at least one historical workflow, wherein said historical workflow execution logs comprise digital traces accumulated about how other previously developed workflows were executed; and executing said simulation stub;

wherein said simulation stub comprises an approximation of said proposed workflow component.

10. The computer program product of claim 9, wherein said workflow authoring methodology further comprises:

generating at least one recommendation related to said proposed workflow component;

wherein said at least one recommendation is derived from said historical workflow execution logs of said at least one historical workflow.

11. The computer program product of claim 10 wherein said at least one recommendation is also derived from a social graph of an author of said proposed workflow component.

12. The computer program product of claim 9, wherein said workflow authoring methodology further comprises:

displaying on a display said proposed workflow component; and displaying on said display a result from said executing said simulation stub.

13. The computer program product of claim 12 further comprising:

said receiving said proposed workflow component occurs during a workflow development session; and said displaying on said display of said result of executing said simulation stub occurs during said workflow development session.

14. The computer program product of claim 13, wherein said workflow authoring methodology further comprises displaying on said display said proposed workflow component simultaneously with said result of said executing said simulation stub.

15. The computer program product of claim 9 wherein said executing said simulation stub comprises a simulation of an interaction with an external system.

16. The computer program product of claim 9 wherein said historical workflow execution logs are stored by said cloud computing environment.

17. A collaborative workflow development system comprising:

a first local computing device in communication with a second local communication device through a collaborative workflow development network;

said first local computing device configured to receive from a first workflow author a first proposed workflow component of a workflow under development;

the collaborative workflow system configured to determine that at least one first historical workflow developed prior to said first proposed workflow component overlaps said first proposed workflow component;

the collaborative workflow system further configured to, based at least in part on the collaborative workflow generating system determining that said at least one first historical workflow developed prior to said first proposed workflow component overlaps said first proposed workflow component, generate a simulation stub derived from historical workflow execution logs of said at least one first historical workflow, wherein said historical workflow execution logs comprise digital traces accumulated about how other previously developed workflows were executed;

the collaborative workflow system further configured to execute said first simulation stub, wherein said first simulation stub comprises an approximation of said first proposed workflow component; and the collaborative workflow system further configured to control, via said collaborative workflow development network, access by said second local computing device to said first proposed workflow component and a result of the collaborative workflow system executing said first simulation stub.

18. The system of claim 17 wherein:

said access comprises write privileges;

said second local computing device is configured to receive from a second workflow author a second proposed workflow component of said work flow under development;

the collaborative workflow system is further configured to determine that at least one second historical workflow developed prior to said second proposed workflow component overlaps said second proposed workflow component;

the collaborative workflow system is further configured to generate a second simulation stub derived from historical workflow execution logs of said at least one second historical workflow; and the collaborative workflow system is further configured to execute said second simulation stub, wherein said second simulation stub comprises an approximation of said second proposed workflow component.

19. The system of claim 18 wherein;

said access further comprises simultaneous write privileges;

the collaborative workflow system is further configured to recommend an allocation of snippets of said workflow under development among said first workflow author and said second workflow author; and said snippets are derived from a social graph of said first workflow author and a social graph of said second workflow author.

20. The system of claim 18 further comprising:

the collaborative workflow system further configured to recommend additional workflow authors based on said social graph of said first workflow author and said social graph of said second workflow author;

a cloud computing environment in communication with said collaborative workflow development environment; and said cloud computing environment configured to store:

said historical workflow execution logs of said at least one first historical workflow; and said historical workflow execution logs of said at least one second historical workflow.

* * * * *